(12) United States Patent
Smith

(10) Patent No.: US 6,224,107 B1
(45) Date of Patent: *May 1, 2001

(54) POCKETBOOK BOOK

(76) Inventor: Reba Hall Smith, 5208 Bowman Rd., Macon, GA (US) 31210

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,015

(22) Filed: May 4, 1998

(51) Int. Cl.$^7$ .............................. B60R 11/06; G09B 25/00
(52) U.S. Cl. .................. 281/15.1; 281/29; 281/31; 281/51; 150/112; 434/128; 434/129; 434/428; 434/429; 383/119
(58) Field of Search .................... 281/51, 29, 31, 281/15.1; 150/112; 434/128, 129, 428, 429; 383/119

(56) References Cited

U.S. PATENT DOCUMENTS

| | | | |
|---|---|---|---|
| 3,316,669 | * 5/1967 | Nachbar | 434/429 |
| 4,063,369 | 12/1977 | Hart | 35/35 |
| 4,274,659 | 6/1981 | D'Ambroshio | 281/34 |
| 4,280,241 | 7/1981 | Pfaff | 412/3 |
| 4,312,393 | * 1/1982 | Green | 206/425 |
| 4,365,438 | 12/1982 | Nelson | 446/75 |
| 4,577,889 | 3/1986 | Schulz | 281/15 |
| 4,768,245 | 9/1988 | Dutton | 5/434 |
| 4,932,679 | 6/1990 | Mayer et al. | 281/18 |
| 4,964,656 | * 10/1990 | Prentice | 281/31 |
| 5,127,674 | * 7/1992 | Lamphere et al. | 283/37 |
| 5,161,731 | * 11/1992 | Rivlin et al. | 383/119 |
| 5,316,404 | 5/1994 | Hensel | 402/79 |
| 5,375,936 | 12/1994 | Jennison et al. | 402/73 |
| 5,405,169 | 4/1995 | Schwartz | 281/16 |
| 5,431,449 | 7/1995 | Arimoto et al. | 281/31 |
| 5,468,152 | * 11/1995 | Lenart | 434/429 |
| 5,533,757 | * 7/1996 | Morris | 281/51 |
| 5,540,609 | 7/1996 | Hoag | 446/26 |
| 5,676,399 | 10/1997 | Hollerbach | 281/31 |
| 5,676,482 | 10/1997 | Hawkins | 402/79 |
| 5,849,390 | * 12/1998 | Dillon | 428/99 |
| 6,110,864 | * 8/2000 | Lu | 283/94 |

* cited by examiner

*Primary Examiner*—A. L. Wellington
*Assistant Examiner*—Mark T. Henderson
(74) *Attorney, Agent, or Firm*—Waddey & Patterson

(57) ABSTRACT

The invention includes a pocketbook adapted to be customized by a consumer. The pocketbook has a plurality of pages and a pocket adapted to hold the pages. The pages are removably held in the pocket. The pages typically have a subject so that the consumer may select pages according to the subject. The pages and the pocket may include a common theme. One embodiment of the invention includes a pocketbook assembly adapted to allow a consumer to assemble a customized pocketbook. The assembly typically includes a page display; a plurality of pages removably supported by the page display; and a plurality of pockets. Generally, each pocket is adapted to hold at least one of the pages. And the pockets are generally available near, or on, the page display. In another embodiment the invention includes a pocketbook kit adapted to allow a consumer to assemble a pocketbook. The kit generally includes a plurality of pages, the pages having a subject; and a pocket for removably holding the pages. The pages would typically include a common theme. Generally the page display comports with the common theme.

10 Claims, 16 Drawing Sheets

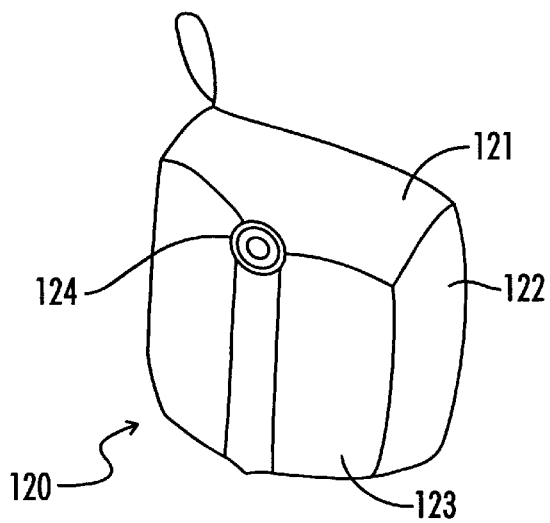
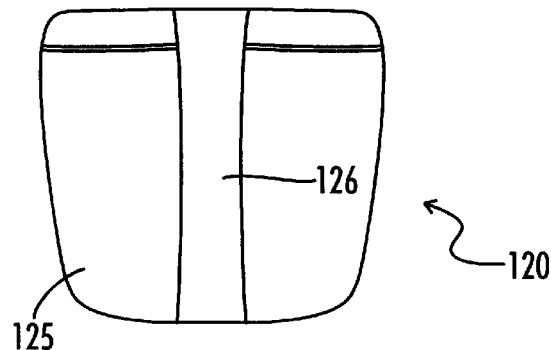
FIG. 11   FIG. 12
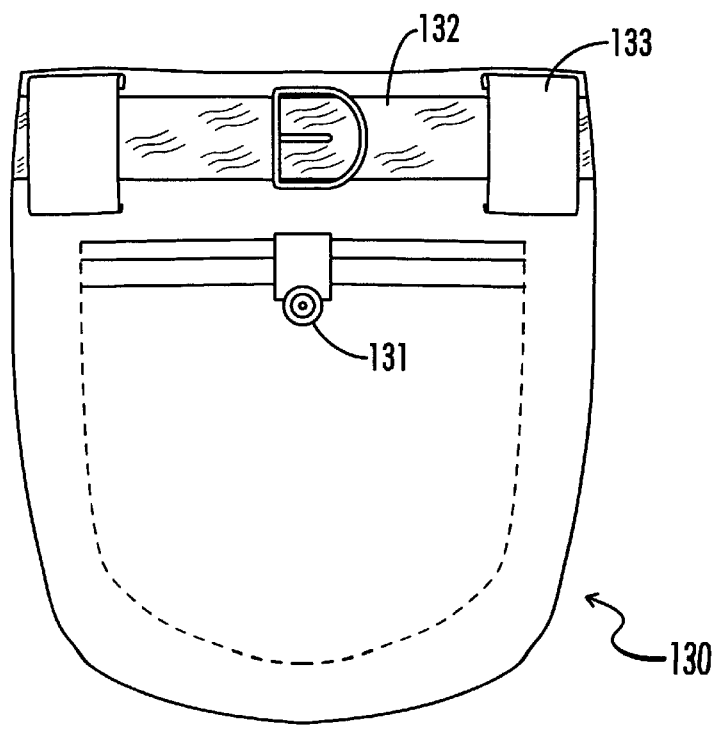
FIG. 13

POCKETBOOK BOOK

BACKGROUND OF THE INVENTION

The present invention relates generally to books. More particularly, this invention pertains to the ability to assemble a custom book or a custom novelty book.

Prior art U.S. Pat. No. 4,063,369 describes a visual storybook teaching tool in which a child selects a number of objects (story figures) and places them in "pockets" that are attached to the pages of a binder or book. The pockets themselves are not a novel feature of the design.

U.S. Pat. No. 5,316,404 describes the design of a photo album page which has multiple expanding pockets for holding photographs.

U.S. Pat. No. 5,375,936 teaches a display album having modular sheet pages for displaying photographs and the like.

U.S. Pat. No. 5,431,449 illustrates a sheet having multiple pockets for storing photographic film.

U.S. Pat. No. 5,676,399 teaches a sports team folder for organizing information about members of a sports team in individual "pockets."

U.S. Pat. No. 5,676,482 shows a display album comprising multiple pages formed of a washable material into a "pocket" shape.

U.S. Pat. No. 5,540,609 shows a "story quilt" that is intended to be hung on a wall for storage and display of dolls. Multiple panels are formed on the front of the quilt, some having pockets for storing various items.

U.S. Pat. No. 4,577,889 describes a book formed of multiple pages of "bags" or pockets.

U.S. Pat. No. 4,768,245 is directed at a combination of a pillow and book which is carried in a pocket attached to the side of the pillow.

None of the prior art include an invention whereby a consumer may create a custom book. What is needed is book which a consumer may custom assemble to include only subjects the consumer wants, or needs. The book should have pages which are easily removable from (and replaceable to) a holding article.

It would be useful if the book could be assembled from a display having a theme so that the consumer could quickly decide to browse the available subjects on the pages available, or move on. If the consumer is interested in the subjects, it would be useful for the page holding article to be interesting, appealing "different" and perhaps matching the theme of the cards (or pages) displayed. Currently, if a consumer is interested in a particular subject, she must buy the whole book.

Further, a typical book may not be 'fun' for a child. What is needed is a book that could be adapted to be fun for a child, or perhaps make a unique gift for an adult. What is need is a book assembly that will allow a consumer to have more purchasing control and more alternatives to chose a book from among.

What is needed is a book assembly which can quickly convey to a potential consumer that a certain type of information is available. What is needed is a book assembly that may serve as an educational tool to teach 'which of these belongs with the rest' association. What is needed is a 'fun' way for the consumer to assemble a custom book containing subjects of her choosing; a fun way to exercise her creativity.

Prior art lacks these needed books and book assemblies.

SUMMARY OF THE INVENTION

The present invention relates generally to books. More particularly, this invention pertains to the ability to assemble a custom book or a custom novelty book.

In one embodiment, the invention includes a pocketbook adapted to be customized by a consumer. The pocketbook has a plurality of pages and a pocket adapted to hold the pages. The pages are removably held in the pocket. The pages typically have a subject so that the consumer may select pages according to the subject. The pages and the pocket may include a common theme.

Another embodiment of the invention includes a pocketbook assembly adapted to allow a consumer to assemble a customized pocketbook. And to exercise her creativity and assemble a unique and individualized book for a unique individual. This could be particularly fun for a child or for an adult who enjoys personalizing gifts. The assembly typically includes a page display; a plurality of pages removably supported by the page display; and a plurality of pockets. Generally, each pocket is adapted to hold at least one of the pages. And the pockets are generally available near, or on, the page display.

The page display will typically represent some common theme so that a potential consumer can quickly determine if information of interest to the consumer is to be had there. For instance, the subjects on the pages may be local maps under a theme of travel. Or maybe tourist and vacation information would be displayed. Bed time stories customized for a particular child's personality and interests. The pocketbook assembly may be used as a teaching tool in one embodiment. It will aid assimilation of information through associative learning. For instance, typical activities of a farmer (or some other vocation) may be included on various pages. Or, one could assemble a pocketbook containing animals of a particular interest, while excluding others.

In another embodiment the invention includes a pocketbook kit adapted to allow a consumer to assemble a pocketbook. The kit generally includes a plurality of pages, the pages having a subject; and a pocket for removably holding the pages. The pages would typically include a common theme. Generally the page display would comport with the common theme and would support the pages for display to a consumer. In one particular embodiment, the pocketbook kit the common theme is planting; and the pages include a plurality of packets of seeds. The pocket holding the seeds would typically include a flower box or planter shape.

The page display would typically support the pages in pockets on the pages display (or in display pockets) which match the common theme. The pages as well as the pocket which hold the pages often include interesting shapes and features. For example, leaf, fruit, or example shapes; apron, shirt, or image features; or the like. The page display may include various representations such as trees, people in a vocation, animals, scenery, etc. The display may be two or three dimensional.

Another embodiment of the invention includes a pocketbook assembly which typically includes a page display figure; a plurality of page supports attached to the page display figure; a plurality of pages removably supported by the page supports; a pocket holder proximate the page display figure; and a plurality of pockets adapted to hold the pages, the pockets removably held in the pocket holder.

It is an object of the invention to provide a book which a consumer may custom assemble to include only subjects the consumer desires; to provide a way for the consumer to exercise her creativity and create a unique book for a unique child or adult. Another object of the invention is to provide a book in which the pages are easily removable from (and replaceable to) a pocket.

Another object of the invention is to provide the consumer a way to quickly decide if the assembly has information useful to the consumer. An objective is to provide this through a page display figure indicative of a theme. Another objective is to provide a pocket in which to assemble the pages where the pocket matches the theme of the cards (or pages) displayed.

An object of the invention is to give the consumer more purchasing control, enabling her to select only the subject information of interest or suitable for a particular person.

Yet another object of the invention is to provide a 'fun' book for a child. Learning is achieved at a more rapid pace when new information is assimilated with old information of a similar nature or category. One objective of this invention is to provide an educational tool to teach such association, in essence, 'which of these belongs with the rest' games.

Another objective of the invention is to provide a 'fun' way for the consumer to assemble a custom book containing subjects of her choosing or to buy a unique and individualized gift.

BRIEF DESCRIPTION OF THE DRAWINGS

FIG. 11 shows a typical shirt pocket style pocket 120 for use with a custom book.

FIG. 12 shows the back of the shirt pocket style pocket 120 shown in FIG. 11.

FIG. 13 is a hip pocket style pocket 130 for holding pages.

DESCRIPTION OF THE PREFERRED EMBODIMENTS

Applicant's invention will be best understood when considered in light of the following description of the preferred embodiment of the invention, as illustrated in the attached drawings.

Figure 1:
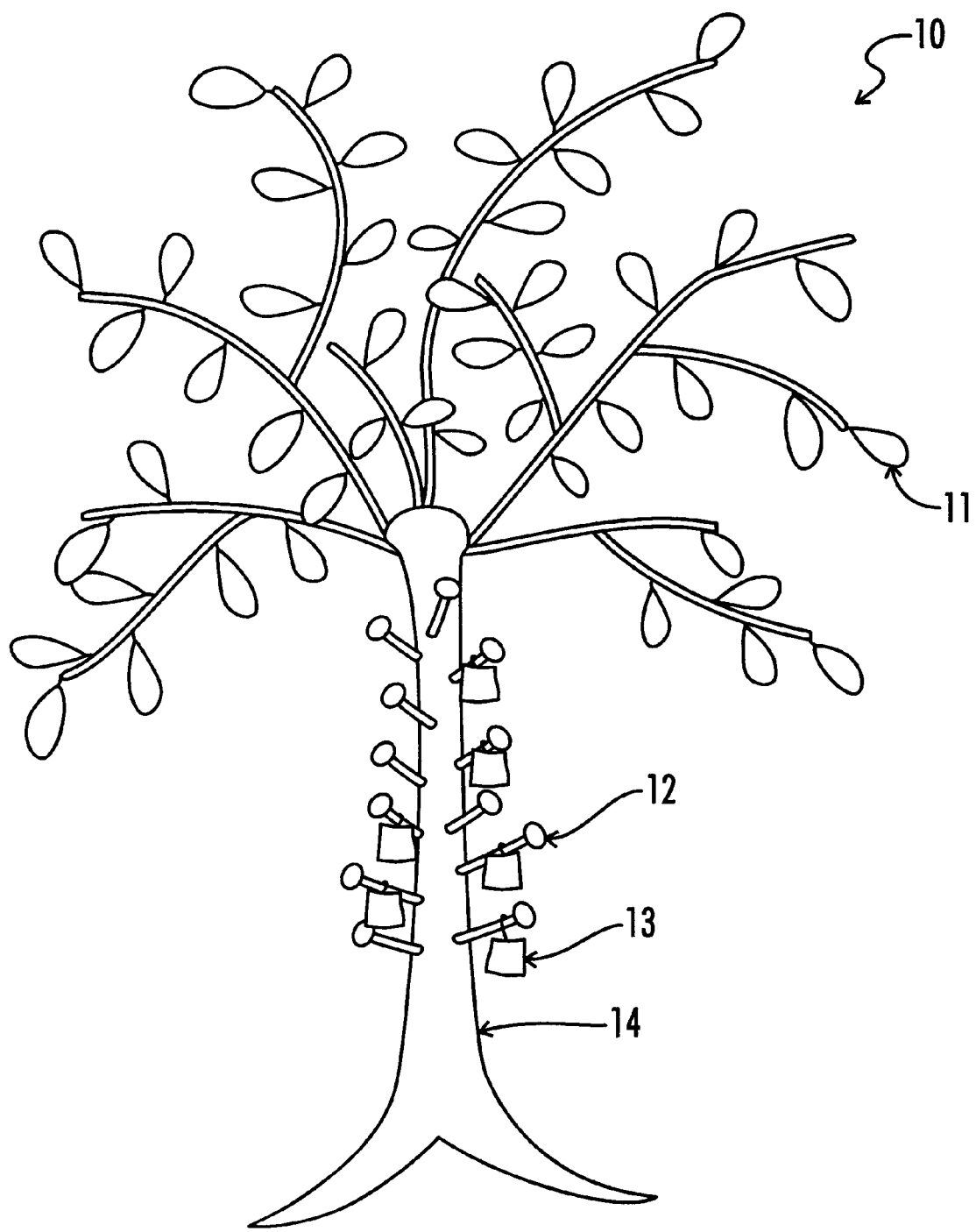
FIG. 1 shows a pocketbook assembly 10. The assembly 10 includes a display 14 sometimes referred to as a Hall Tree.

FIG. 1 shows a pocketbook assembly 10. The pocketbook assembly includes pages 11 to be selected by the consumer. A plurality of pocket holders 12 hold a plurality of pockets 13 on a display 14. The display 14 also supports the pages 11. The display 14 shown in FIG. 1 is also referred to as a Hall Tree. It may be three dimensional or cardboard cutout or any conventional display. The consumer would select one of the pockets 13 from one of the pocket holders 12, then select various pages 11 and then place pages in the pocket, thus forming a pocketbook. The pages 11 shown in FIG. 1 are in the shape of a leaf or a variety of shapes representing a variety of leaves. The leaves on the Hall Tree 14 could be changed to correspond to the season. For instance, buds for spring, leaves for summer, and multi-colored fall leaves for autumn. Likewise, the subject of the pages could be changed to correspond to the seasons or a particular holiday such as Mother's Day or Christmas.

Figure 2:
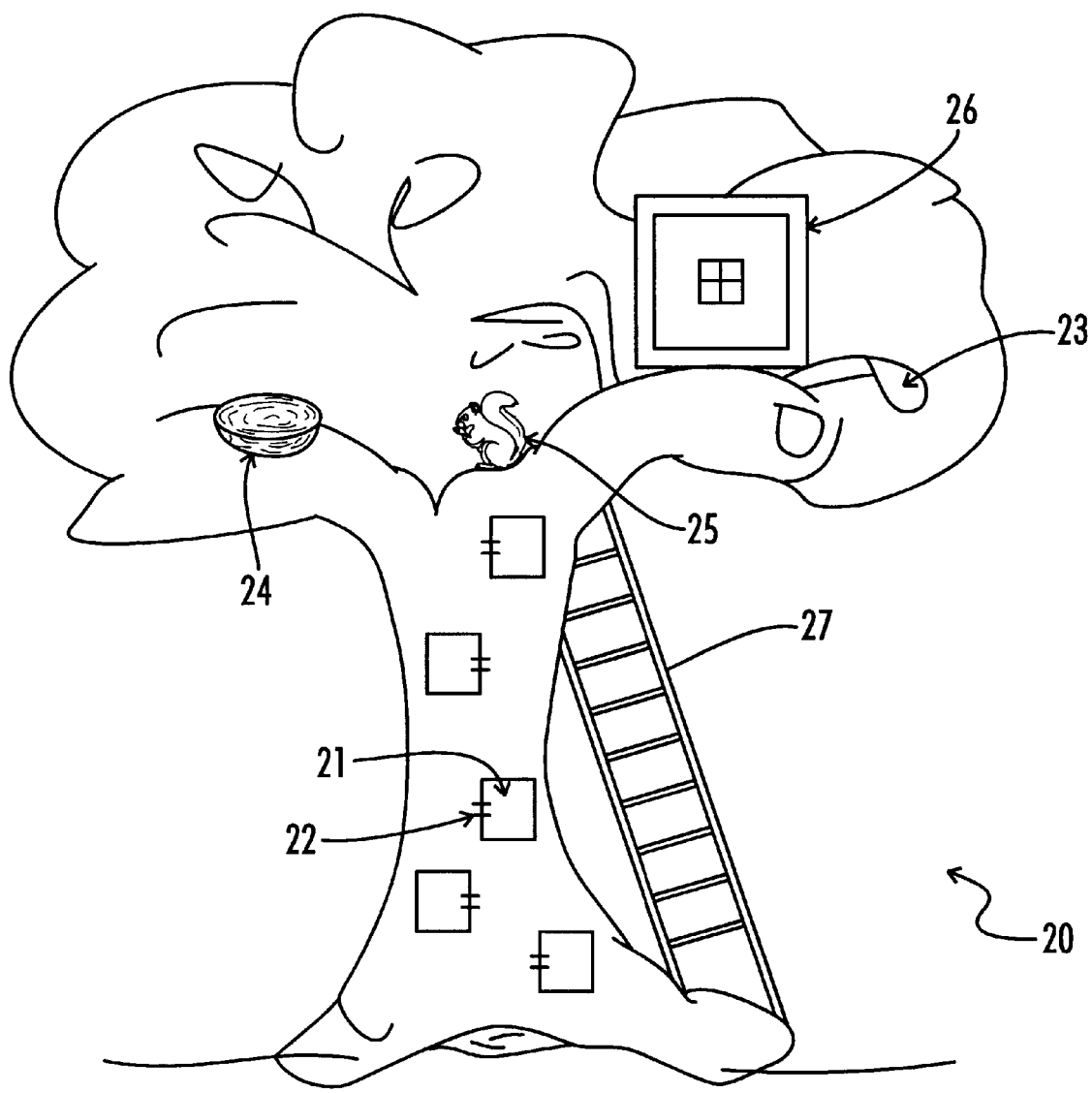
FIG. 2 shows a Playhouse Tree pocketbook assembly 20.

FIG. 2 shows a Playhouse Tree pocketbook assembly 20. It includes tree pocket holders 21 for holding pockets, pages, or both. The tree pocket holder 21 is shown with a hinged door 22 in FIG. 2. The Playhouse Tree 20 also includes other points of interest such as a bird's nest 24, a squirrel or similar animal 25. It may include a playhouse 26 up in the branches of the tree as well as a ladder 27 to reach the upper length of the tree.

Figure 3:
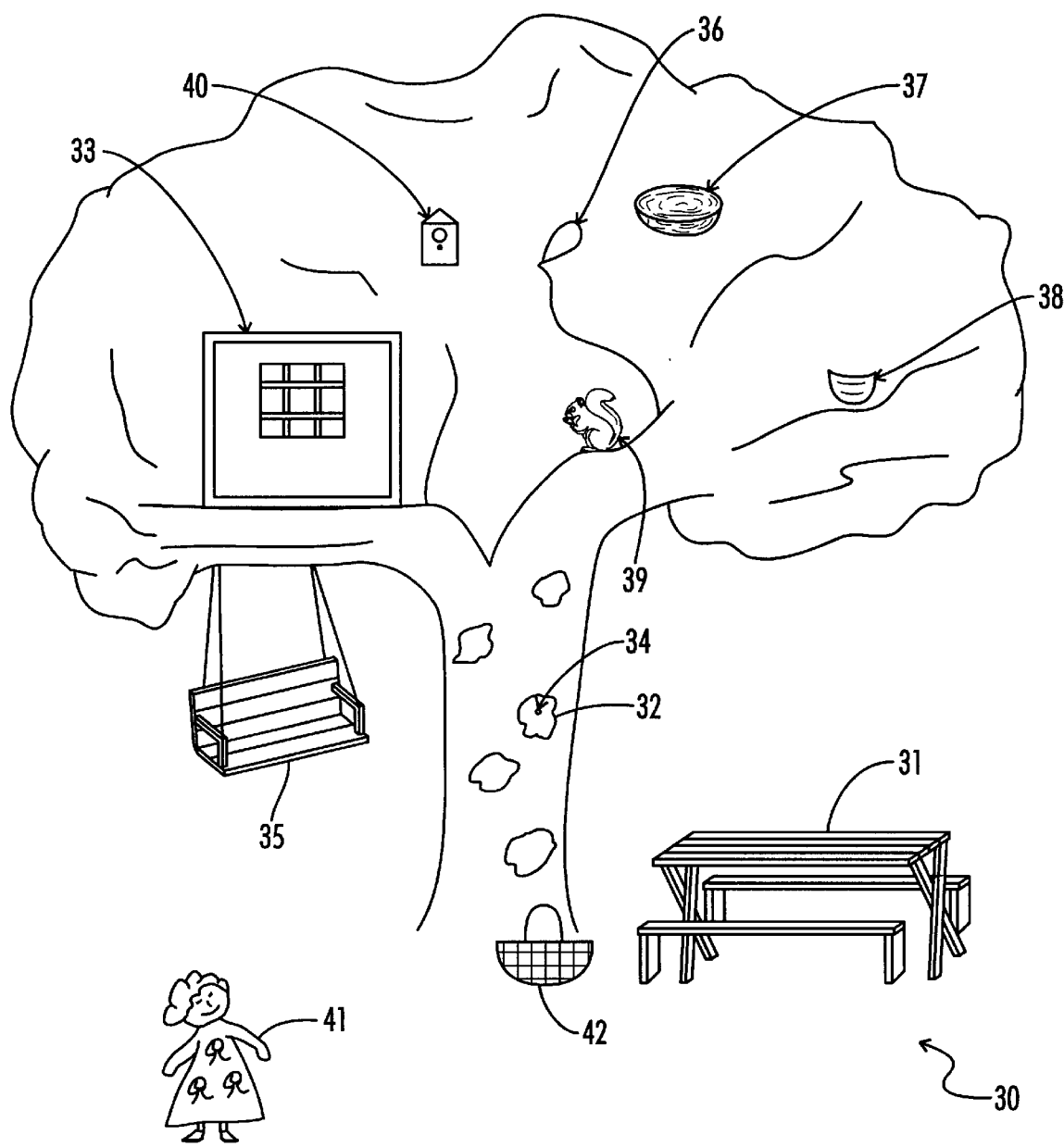
FIG. 3 shows an alternate embodiment of a playhouse tree 30.

FIG. 3 shows an alternate embodiment of a Playhouse Tree 30. It includes a picnic table 31 for sitting and reading the pocketbook. Knot holes 32 in the display may be used for storing pockets 12 or cards 11 (pages of the pocketbook). A playhouse 33 may be associated with the tree, and be used to store pockets or pages for backup inventory or for actual display. Knot holes 32 may optionally include a sound device (not shown) for playing theme music, for instance, "Don't Sit Under the Apple Tree With Anyone Else But Me". The sound device may be located in any convenient place on the display. A sound device may also be included in any page or pocket of a pocketbook. (See FIGS. 23a and 23b.) The embodiment shown in FIG. 3 also includes a swing 35. Leaf pages 36 which would be chosen by the consumer are shown on the branches of the display. A bird's nest 37 may be used for storing extra pages or pockets. The pockets 38 may be in the shape of leaves, birds' nests, or ordinary rectangular books. A squirrel 39 is shown for the added effect, as is a bird house 40. Cutout FIG. 41 may show a person in an occupation and may include the pockets 38 or the pages 36. Basket 42 may also be used to hold additional pockets or selections of cards.

Figure 4:
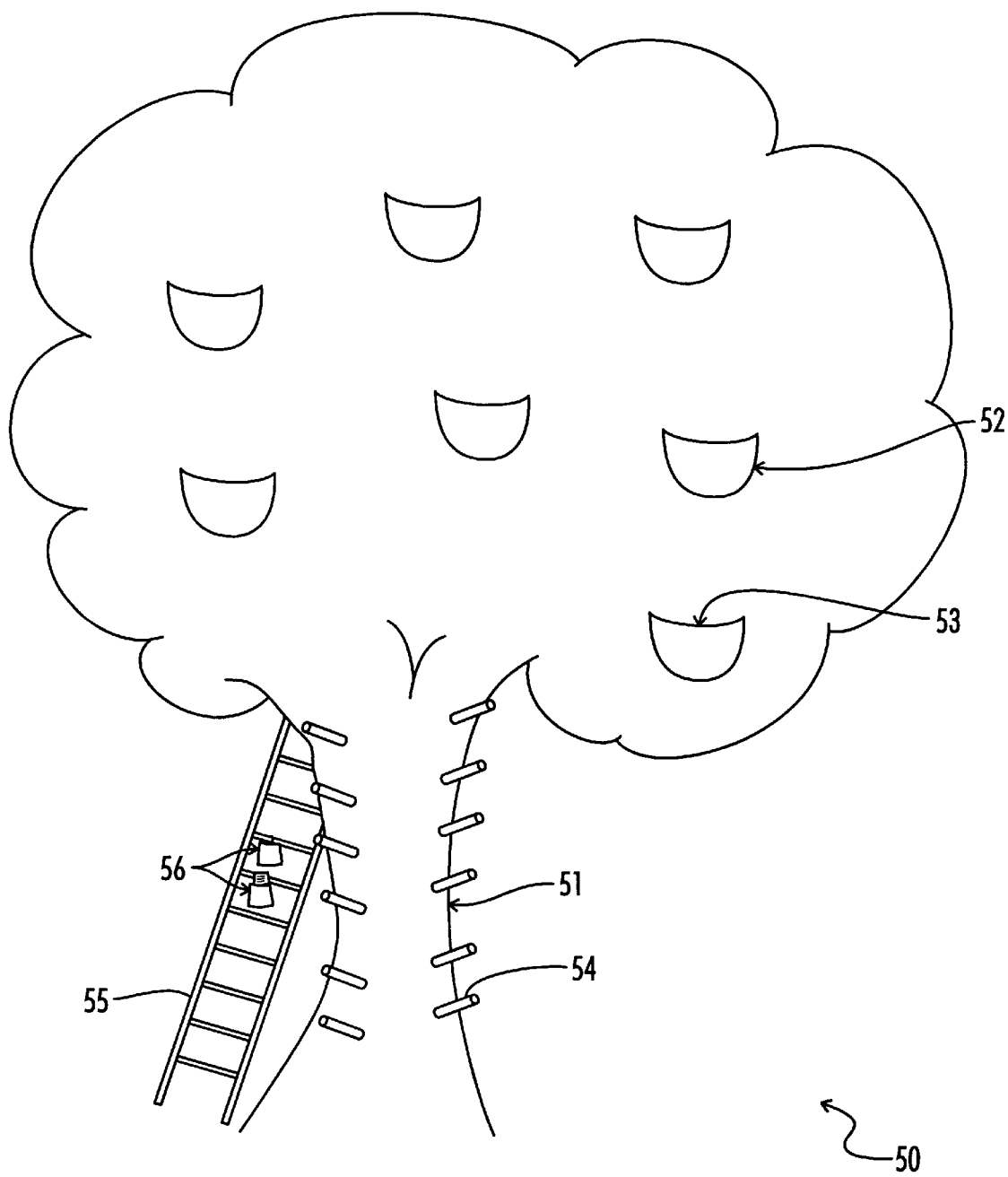
FIG. 4 shows another tree pocketbook assembly embodiment 50

FIG. 4 shows a pocket assembly book 50 with a page display FIG. 51 of a tree. Pockets 52 may be in the shape of leaves or any conventional shape. The pocket holders would hold the pages 53. The pages 53 may alternatively be packets of pages. Dowels 54 extending from the tree 51 may also be used to hold pockets 52. A ladder 55 is shown, it may be an additional location to hold pockets 56 or pages 53, or just used for added effect. Additional packets 53 and pockets 56 are shown on the ladder 55.

Typically, a pocket assembly would include a theme, for instance, that of a vocation, of family values, of nature, of cooking, etc. The themes available for selection are as diverse as a person's imagination. The pages may include various subject matter corresponding to the theme. For instance, in a nature theme, the subject may include local flora, fauna, or local points of interest; perhaps the topography or geology of the region. The pages or cards might be just pictures or written descriptions and they might be cutout in appropriate shapes to represent corresponding subjects. There could be complete stories, or just pithy sayings on the pages. The pages may be hard plastic laminated cards (ideal for cooking), or thin light weight pages (ideal for traveling), or packets of multiple pages, or any conventional format. Again, the possible subjects are virtually unlimited. That is one appeal of the pocketbook assembly, it enables consumers to select the subjects that interest them.

Figure 5:
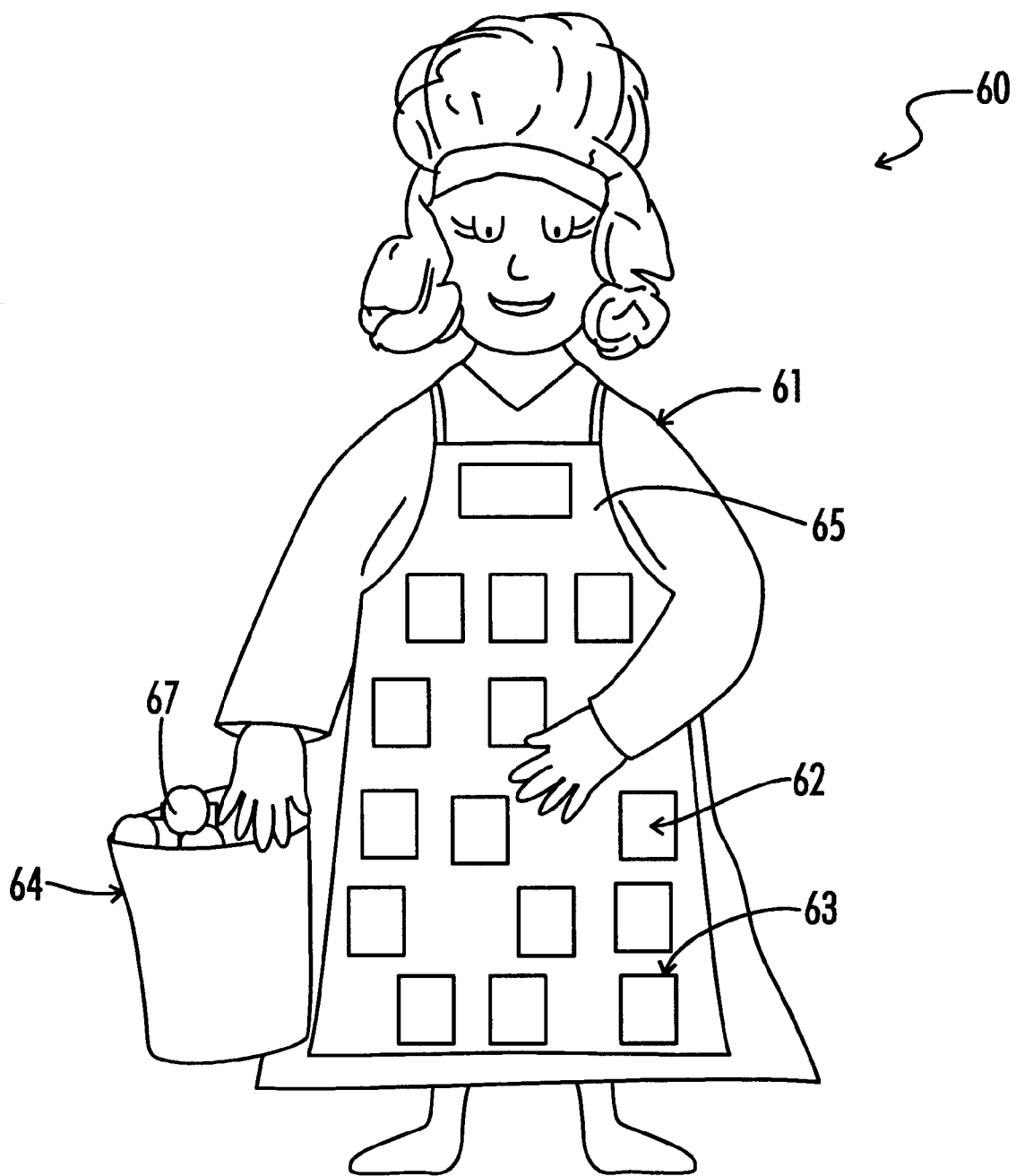
FIG. 5 shows a cooking theme for a pocketbook assembly 60.

FIG. 5 shows an alternate theme for a pocketbook assembly 60. The theme shown is that of cooking. FIG. 61 is a cutout of a showing a baker, a chef, or a homemaker, with an apron 65. The apron 65 includes pocket page containers 62 in the shape of pockets (or display pockets) for storing pages 63. The page containers (or holders) might show individual themes on the outside of the display pockets 62 indicating particular recipes on the pages 63 in which the pages 63 are stored. The pages 63, of course, could be packets of recipes related to particular foods, or individual cards or any conventional format. In one embodiment, the cards are washable. Typically a bowl, or in this case a grocery sack, would be used as a pocket holder 64 for holding the pockets 67 in which the consumer is to keep the pages 63. The consumer would select a pocket of choice from the pocket holder 64, and then select appropriate cards 63 from the various display pockets 62 on the display 61, thus allowing the consumer to create a customized pocketbook or a custom book.

Figure 6:
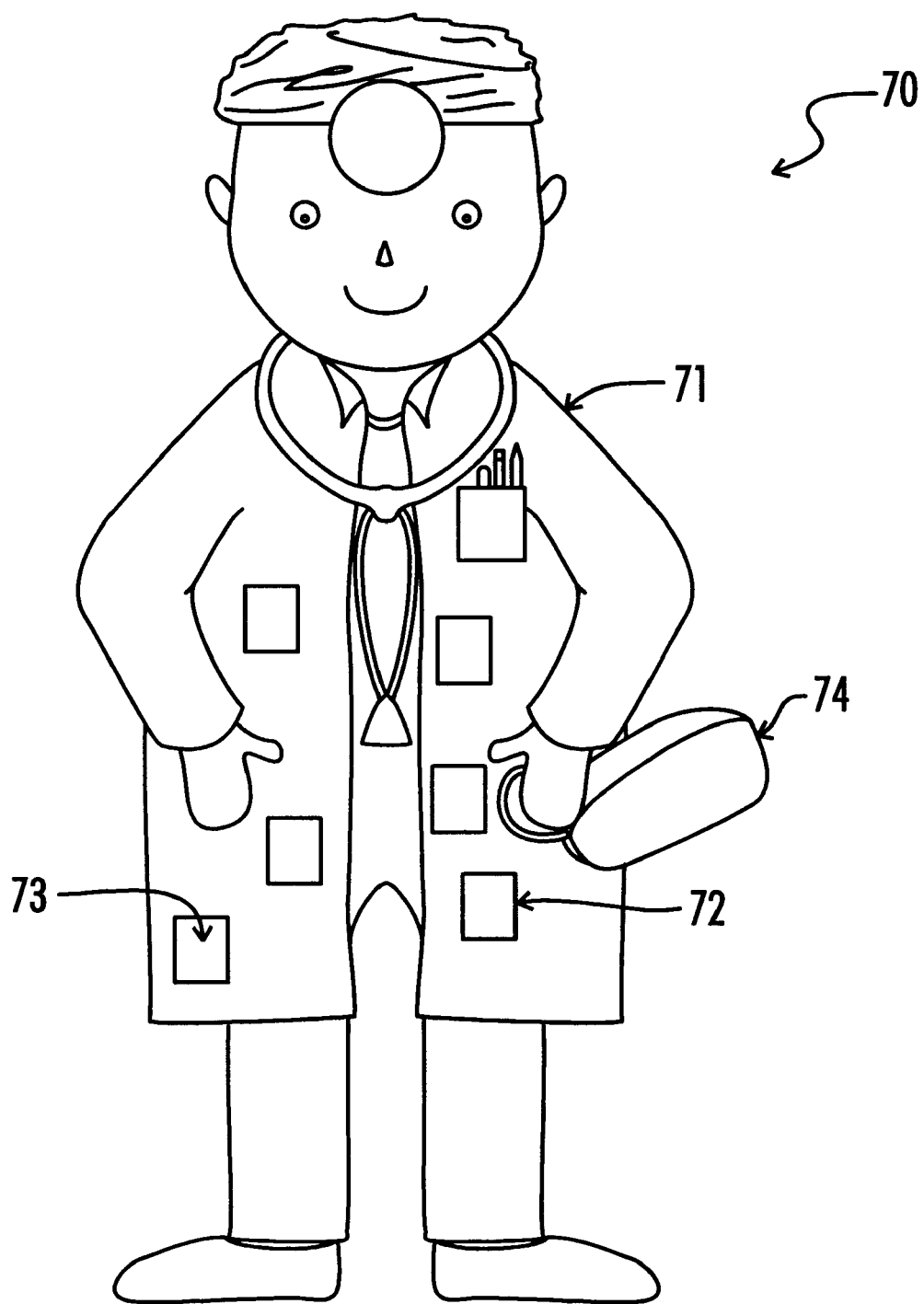
FIG. 6 shows a medical theme pocketbook assembly 70.

FIG. 6 shows a doctor or other medical personnel in a medical theme pocketbook assembly 70. It includes a display figure representation 71 (representing a medical theme or a person in a medical field). Page holders 72 in the shape of pockets hold individual (or groups of) pages 73 for the consumer to select. A medical bag, or similar device typically associated with the medical profession, is used for storing the pockets (not shown) for the consumer to keep the pages in.

Figure 7:
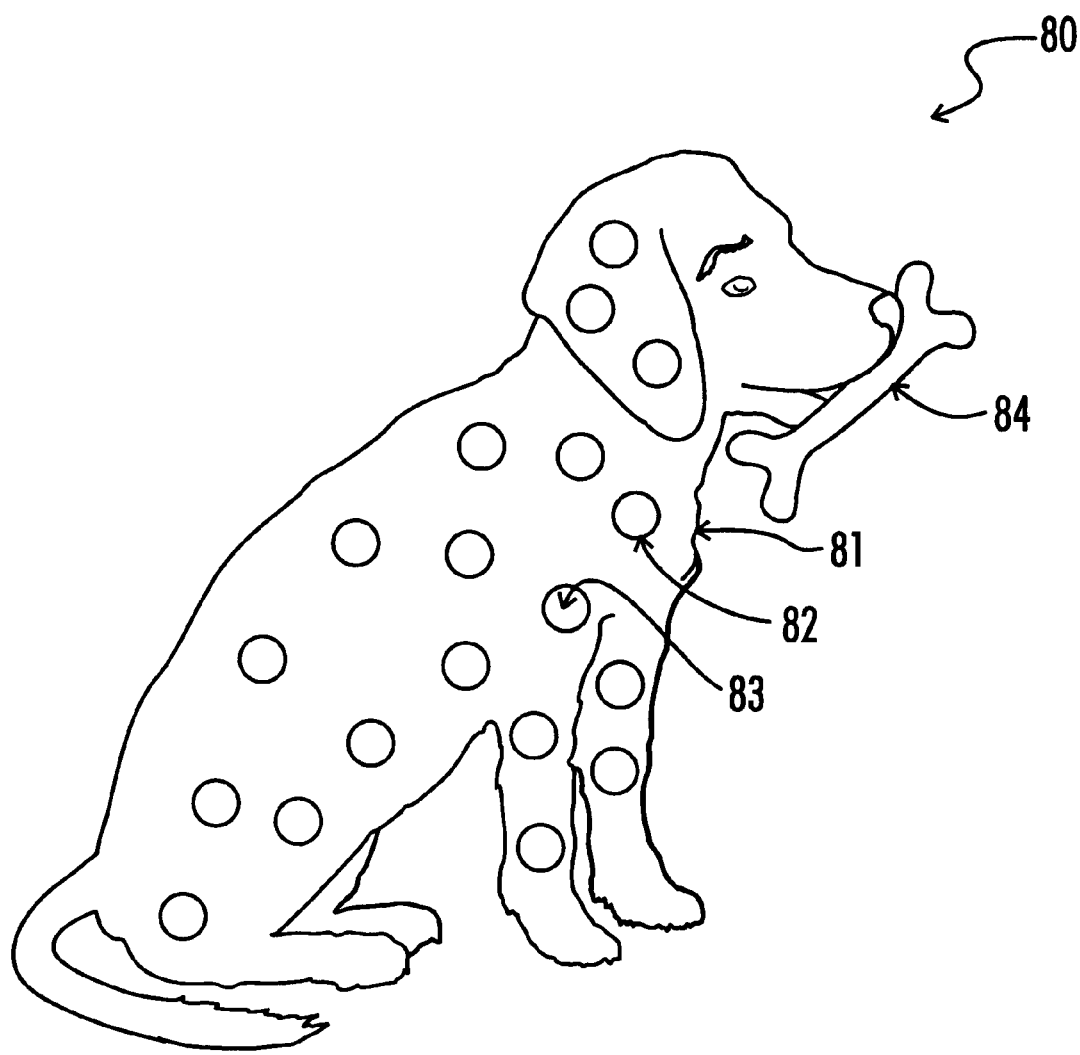
FIG. 7 shows an animal theme for the pocketbook assembly 80.

FIG. 7 shows an animal theme for the pocketbook assembly 80. The page display figure is that of animal, in this case a dog 81. The dog 81 includes display pockets 82 on the display 81 for holding the pages 83. The pockets (not shown) for the pages 83 might be stored in a bone 84 in the dog's mouth. The themes or subjects displayed on the display FIG. 81 may be any appropriate theme such as how to train dogs, what to feed your animals, what type of flea and tick medicine is best, etc. Other appropriate animal themes or subjects may cover the type of animal at a local game reserve, or hunting area, or nature reserve and the cards might be used for educational purposes or simply for souvenirs. The page display dog 81 may, of course, be two dimensional or three dimensional.

Figure 8:
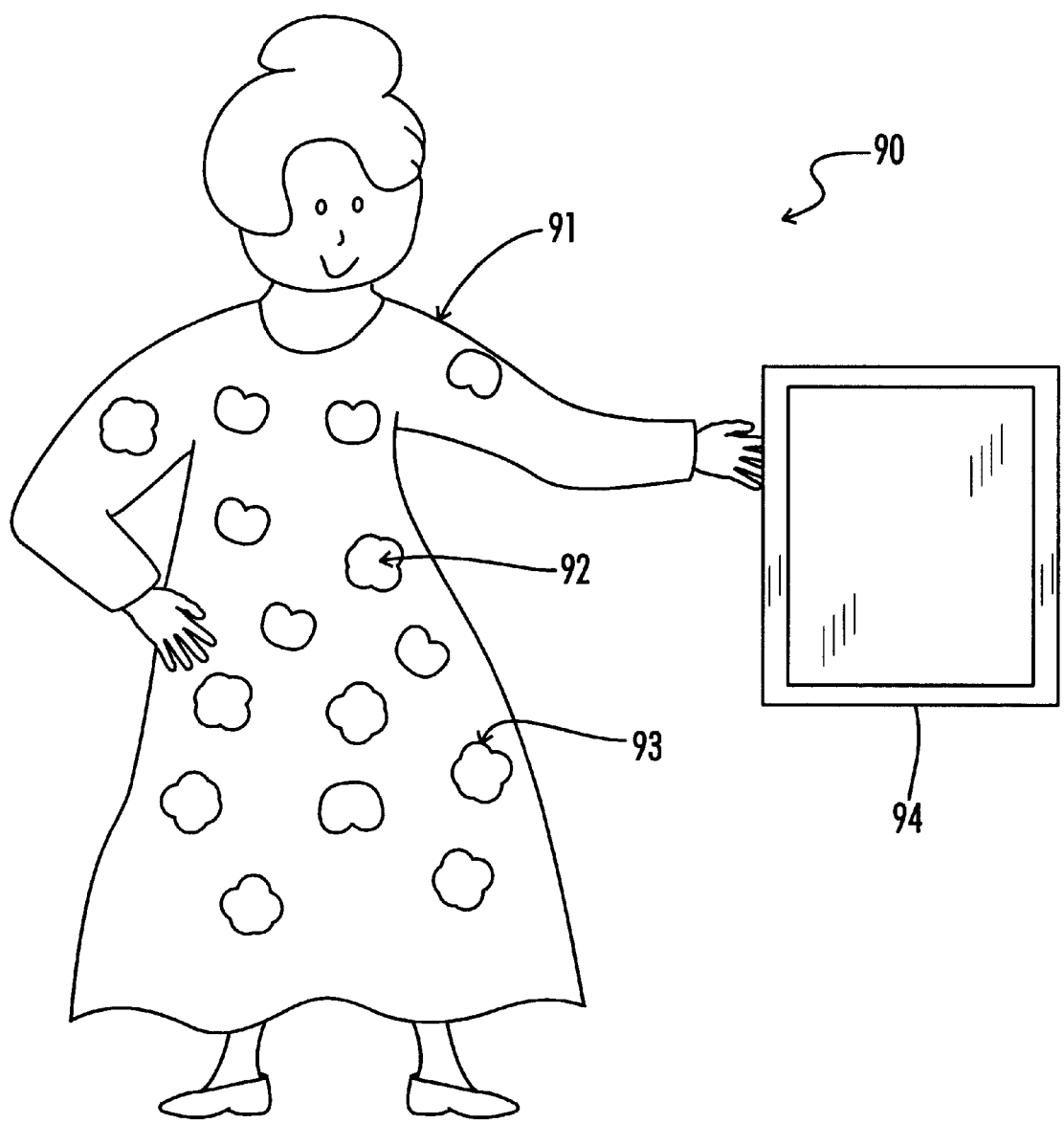
FIG. 8 shows another embodiment for a custom book assembly 90. It includes a display FIG. 91 which is a representation of a teacher.

FIG. 8 shows another embodiment for a custom book assembly 90. It includes a display FIG. 91 which is a representation of a teacher. The teacher 91 includes display pockets 92 for holding pages 93. The pockets (not shown), in which the pages 93 might be held by the consumer, could be kept in a chalkboard 94. The chalkboard 94 is one object typically associated with a teacher, there are many others. This would be true with most professions.

Figure 9:
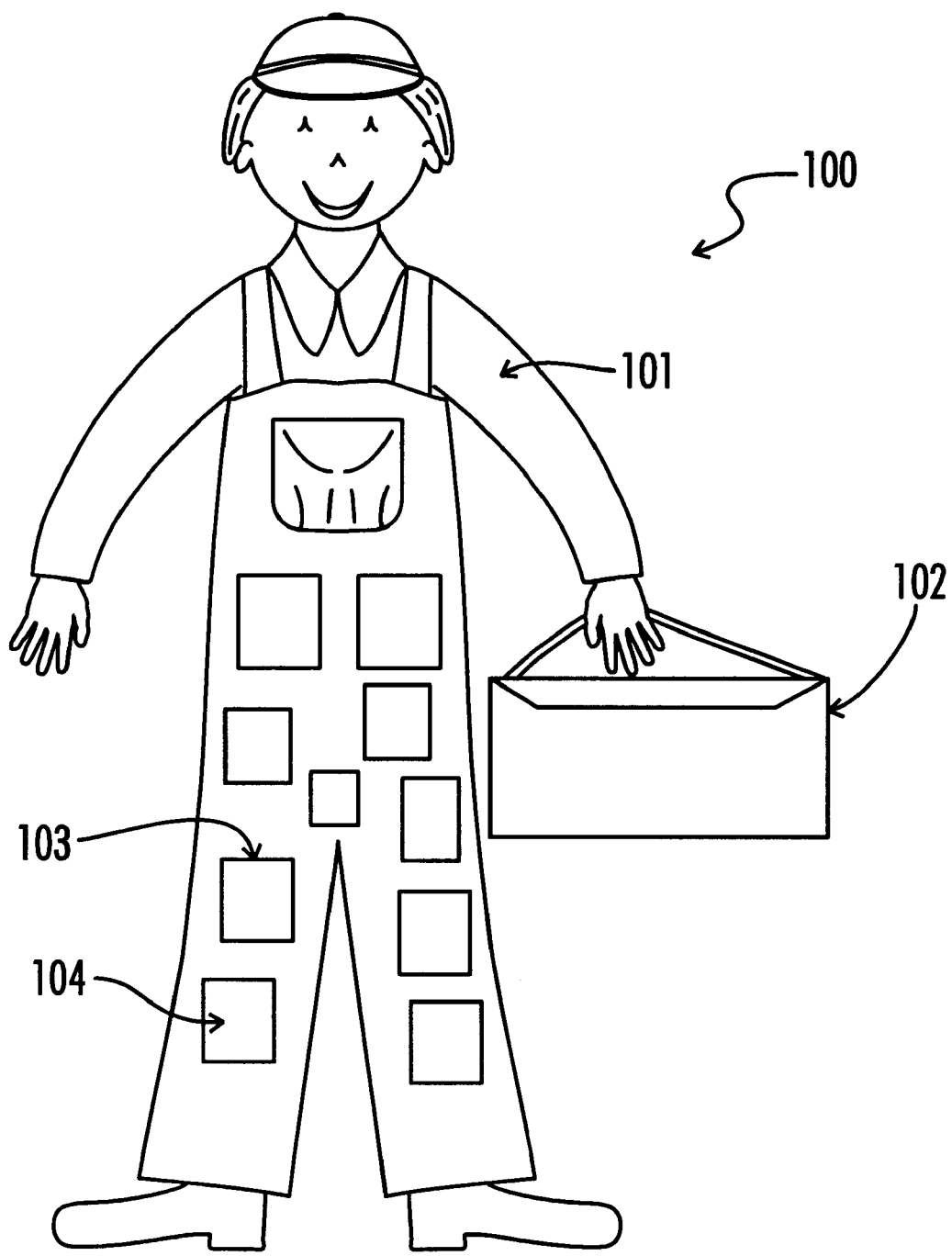
FIG. 9 shows a custom book assembly 100 which includes a carpenter page display FIG. 101.

FIG. 9 shows a custom book assembly 100 which includes a page display FIG. 101 of a carpenter. The page display FIG. 101 includes a tool box 102 which might be used for holding pockets (not shown). But, any object typically associated with carpentry would do. Pages 103 would be stored in display pockets 104. The pockets (not shown) stored in the tool box 102 could be of an appropriate theme to match carpentry (or farming or any theme comporting with a display including overalls).

Figure 10:
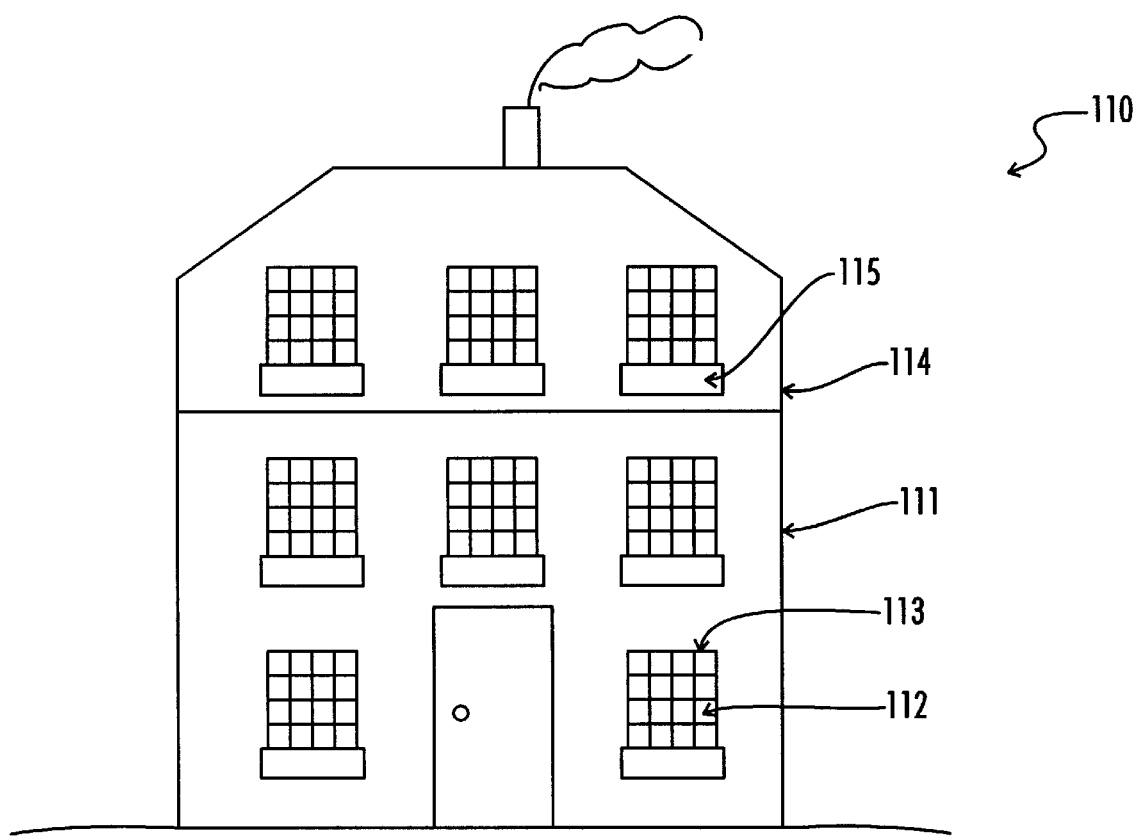
FIG. 10 shows an architectural embodiment of a custom book assembly 110.

FIG. 10 shows a custom book assembly 110 using an architectural theme. It includes a house display FIG. 111. The windows 112 may be used to hold pages (or packets of pages) 113. Pages 113 may be placed behind, or in front of, the windows. The roof 114 might be hinged for storage of extra pockets (not shown) or for pages 113. The window boxes 115 may also serve as a location for storing pockets (not shown) for holding the pages 113.

FIG. 11 shows a typical shirt pocket style pocket 120 used in conjunction with a custom book. The pocket 120 shown in FIG. 11 includes a flap 121, a side 122, a front 123, and a closure 124. Typically, the pockets used with the custom book assembly would comport with the theme of the display or with the theme of the cards. Alternatively, a variety of pockets would be available for selection and the cards would include a variety of themes and subject. The consumer would have chosen the pocket and the cards, thus creating a custom book (or pocketbook) with a customized theme, book cover (or book pocket), and subject matter.

FIG. 12 shows the back of the shirt pocket style pocket 120 shown in FIG. 11. It includes a back 125 and a supporting strap 126.

FIG. 13 is a hip pocket style pocket 130 for holding pages. It includes a closure 131, a belt 132. A loop 133 for holding the belt onto the hip pocket. Typically the belt 132 would continue all the way around the pocket 130.

Figure 14:
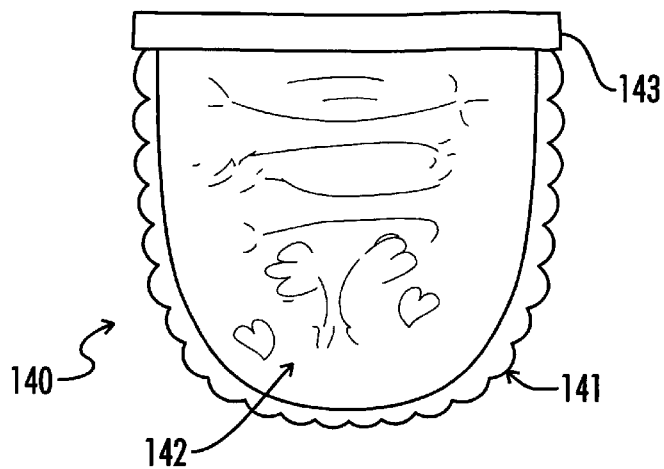
FIG. 14 shows an apron theme pocket 140.

FIG. 14 shows another theme pocket 140. It is an apron pocket. The apron pocket 140 shown in FIG. 14 includes a lace trim 141 and a picture on the front 142 as well as a waistband 143. The apron may be functional so that it actually prevents spillage on the consumer's clothing. And it would typically include a pocket for holding the cards.

Figure 15:
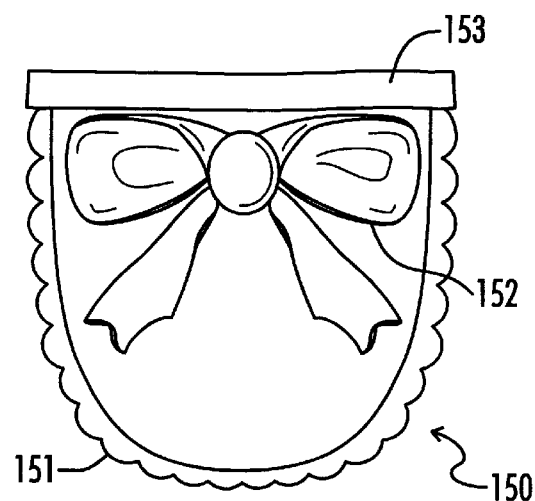
FIG. 15 shows an alternate embodiment of an apron style pocket 150.

FIG. 15 shows an alternate embodiment of an apron style pocket 150. The apron pocket 150 includes a lace trim 151, a bow 152, and a waistband 153.

Figure 16:
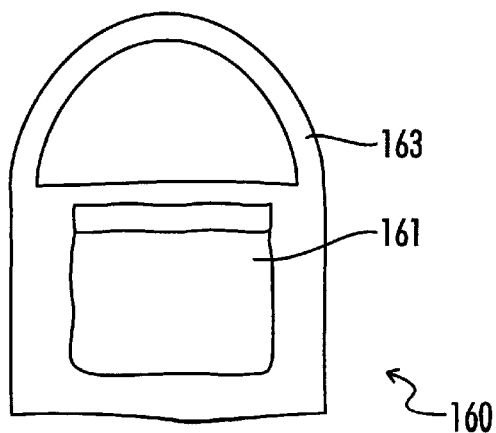
FIG. 16 shows a neck style apron pocket 160.

FIG. 16 shows another apron style pocket embodiment 160 which includes a pocket for holding pages, i.e., a page holder 161, and a neck strap 163. The apron pocket shown in FIG. 16 is functional. So a baker might keep the recipe handy, stuck down in the pocket 161, while keeping the flour and egg off of herself while baking a cake, any similar combination of ingredients and foods.

Figure 17:
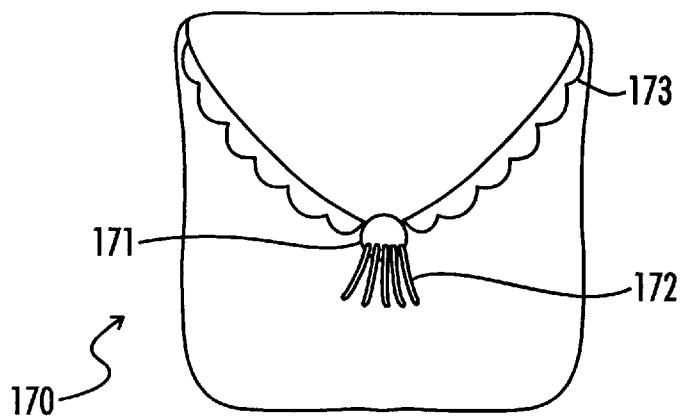
FIG. 17 shows a pillow style pocket 170.

FIG. 17 shows what might be called a pillow style pocket embodiment 170. It includes a loop fastener 171, a tassel 172, and a lace fringe 173.

Figure 18:
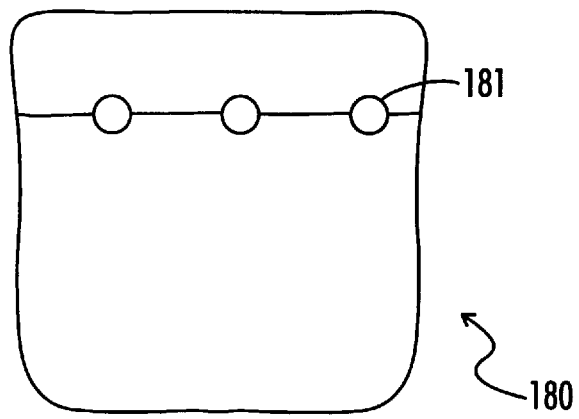
FIG. 18 show another pillow style pocket 180.

FIG. 18 includes another embodiment of a pillow pocket 180. Pillow pocket 180 includes hook and loop fasteners 181. The pillow pocket 180 may be padded, or may be nonfunctional, or may be sized to contain the packets or pages. Likewise, any style of pocket may be padded and appropriately sized. Some appropriate themes used with a pillow pocket might be those associated with bedtime stories or nighttime prayers, or the like.

Figure 19:
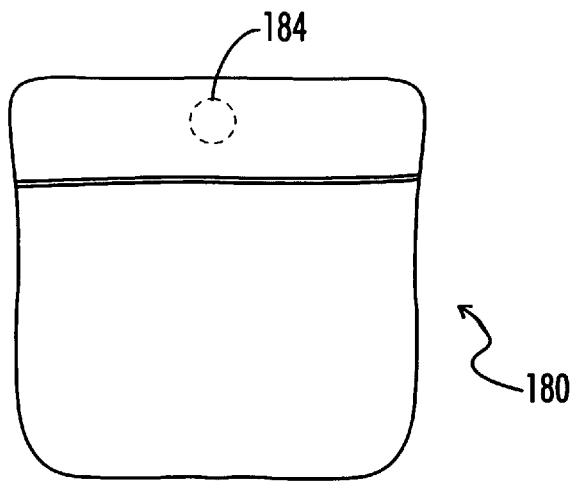
FIG. 19 shows a pillow pocket 180 similar to the one shown in FIG. 18, however, it includes a hook and loop fastener 184 on the inside of the pillow packet.

FIG. 19 shows another embodiment for a pillow pocket 180, however, it includes a hook and loop fastener located on the inside of the pillow pocket 180.

Figure 20:
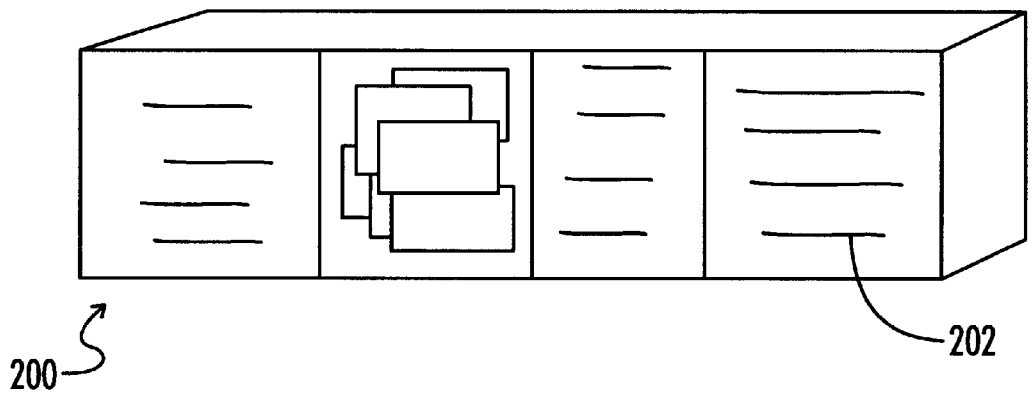
FIG. 20 shows a window box display FIG. 200.
Figure 21:
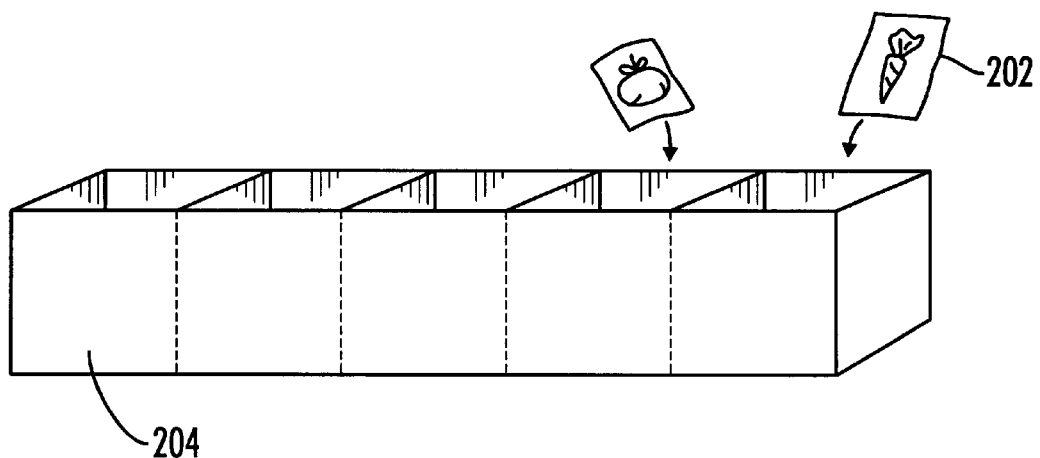
FIG. 21 shows a pocket 204 in the shape of a window box for receiving pages 202.

FIG. 20 shows a window box display FIG. 200. The leaves or pages 202 might be stacked vertically or horizontally within the display FIG. 200. FIG. 21 shows a window box pocket 204 for holding pages 202. This might be appropriate for a theme for planting herbs, fruits, vegetables and the like.

FIG. 21 shows a pocket 204 in the shape of a window box for receiving pages 202. The pages 202 shown in FIG. 21 are packets of seeds. In one embodiment the window box pocket is flexible fabricate adapted to fold flat when no pages are in the pocket 204.

Figure 22:
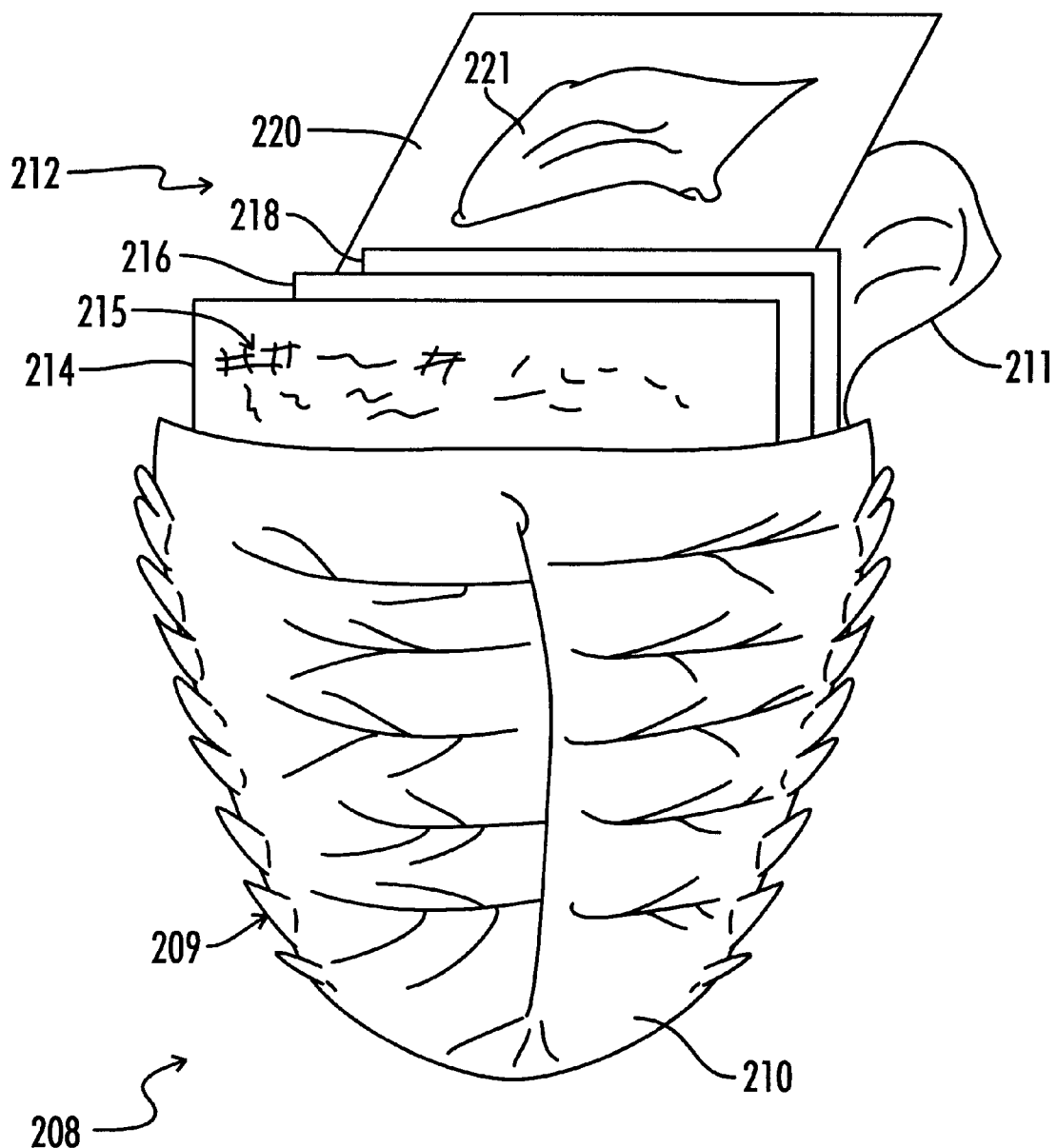
FIG. 22 shows a pocketbook 208 in the shape of a leaf.

FIG. 22 shows a pocketbook 208 in the shape of a leaf. It includes a pocket 209 for holding a plurality of cards (or pages) 212. The pocket 209 shown includes a pouch 210 and a closure 211. The plurality of cards 212 includes a card 214 including symbol or representations 215; and a card 220 including an image 221.

Figure 23A:
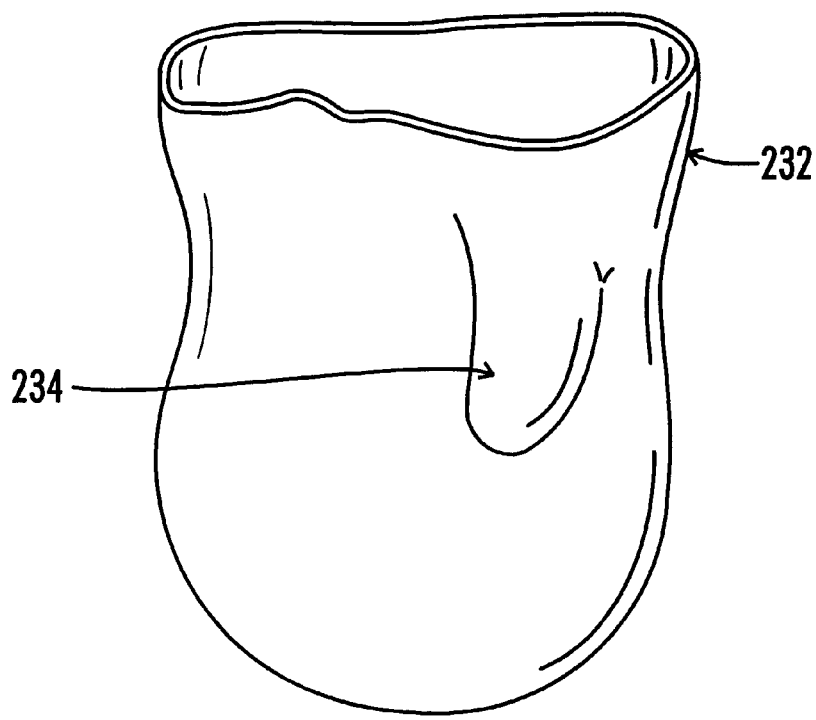
FIGS. 23a and 23b show a mitten pocket 232 and page 236 for a cold theme.
Figure 23B:
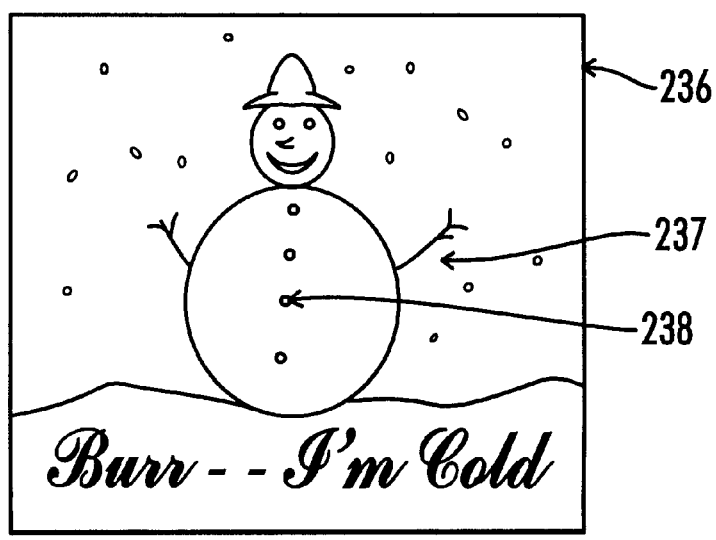

FIG. 23a shows a mitten pocket 232 having a thumb 234. A sound device for playing a winter, or cold, theme song, such as "Frosty the Snowman" could be located in the thumb 234. A sound device may also be incorporated into a page in the pocketbook such as is shown in FIG. 23b. FIG. 23b shows a card 236 having as snowman scene 237. A sound device 238 could be incorporated into a button on the snowman scene 237. Those skilled in the art will be aware of other conventional locations for sound devices.

It should be evident that many display figures and themes might be used for presenting the pocketbook (or custom book) assembly to consumers. A wall hanging style display might be one such choice. The cards may be supported in pockets or dowels or other conventional manner. Another type of assembly might include a display for holding the cards and another display, perhaps a clothes line display, for holding various pockets.

One theme might be that of a traveler, where the pages are various maps.

In an assembly with a cooking or baking theme, appropriate subjects might be various recipes, types of cookware available, or any other cooking related subject. The pockets might be cookbooks, or maybe an oven-mitt shape, where the pockets are washable or cleanable; and the pages, in one embodiment, would be washable as well.

The pockets may also be displayed in a mobile-type display where they are hanging or swinging and the consumer selects one pocket from among those hanging.

The representations, or images on the page could be formed in any conventional manner such as sewing patterns, either by hand or computerized; adhesives; printing and the like. The cards may be cut-outs as well representing an object matching the theme. Cards may also have various subject representations including shaped, pictures, text, maps, souvenirs, etc.

One theme could include bird watching where the subject is the local birds available at the particular region. The consumer would select the birds he needs further information about, and not have to buy cards covering birds he is familiar with, or birds not in the region. Similarly, a vacation theme might include various cards representing either vacations available to different spots; or various adventures available at particular resorts. The display figure could be any appropriate vacationer image, or service representative.

Thus, although there have been described particular embodiments of the present invention of a new and useful Pocketbook Book, it is not intended that such references be construed as limitations upon the scope of this invention except as set forth in the following claims.

What is claimed is:

1. An assembly for use in a store adapted to allow a consumer to assemble a pocketbook having a plurality of individual pages that can be removably held in a pocket, the assembly comprising:

a page display;

a plurality of page supports attached to the page display, each page support adapted to hold a plurality of individual pages;

each of the plurality of pages removably supported by a corresponding one of the page supports, each of the page supports supporting one of the pages so that a substantial portion of decorative indicia on each of the pages is visible to the consumer when looking at the display; and a plurality of the pockets in operative association with the page display such that the pockets are separated from the pages supported on the display.

2. The pocketbook assembly of claim 1, further comprising a pocket holder removably holding the pockets, the pocket holder proximate the page display.

3. The pocketbook assembly of claim 2, wherein the pockets further comprise decorative indicia corresponding to a theme.

4. The pocketbook assembly of claim 1, wherein the pages further comprise a theme.

5. The pocketbook assembly of claim 1, wherein the page display further comprises a theme.

6. The pocketbook assembly of claim 2, wherein the pocket holder is attached to the page display.

7. The pocketbook assembly of claim 5, further comprising a sound device which corresponds to the theme of the pages.

8. The pocketbook assembly of claim 7, wherein the pages comport with the theme.

9. A pocketbook assembly adapted to allow a consumer to assemble a pocketbook, the assembly comprising:

a page display having a theme;

a plurality of pages removably supported by the page display;

a plurality of pockets, each pocket adapted to hold at least one of the pages, the pockets in operative association with the page display;

a pocket holder removably holding the pockets, the pocket holder proximate the page display and wherein the pocket holder is an object generally associated with the theme; and a plurality of page supports attached to the page display, the page supports supporting the pages wherein the page supports further comprise display pockets comporting with the theme.

10. An assembly adapted to allow a consumer to assemble a pocketbook having a plurality of individual pages that can be removably held in a pocket, the assembly comprising:

a page display wherein the page display comprises a theme;

a plurality of page supports attached to the page display;

each of the plurality of pages removably supported by a corresponding one of the page supports, each of the page supports supporting one of the pages so that a substantial portion of decorative indicia on each of the pages is visible to the consumer when looking at the display;

a plurality of the pockets in operative association with the page display such that the pockets are separated from the pages supported on the display;

a plurality of pockets; and a pocket holder removably holding the pockets, the pocket holder corresponding to the theme of and proximate the page display.

* * * * *